March 7, 1944.   H. S. HOFFAR   2,343,507
ANTIFRICTION SCREW DEVICE
Filed Feb. 10, 1943
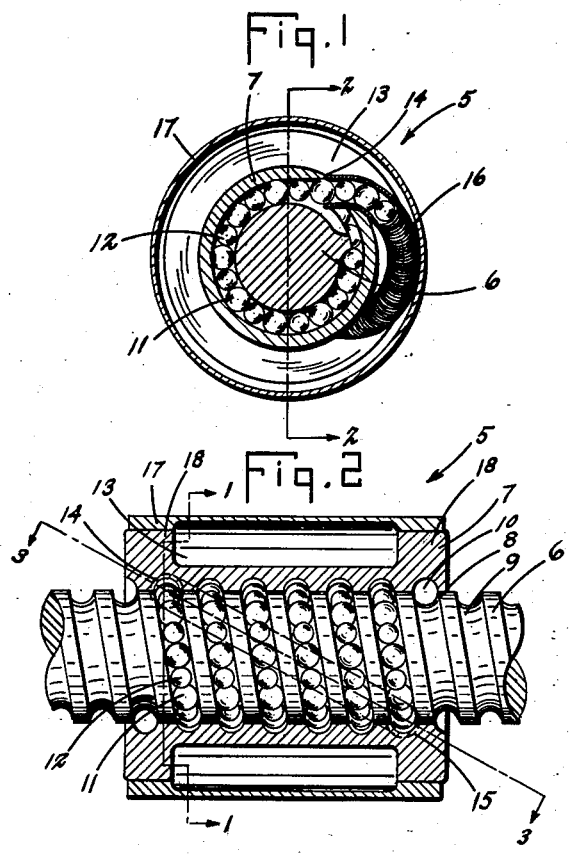
INVENTOR
HENRY S. HOFFAR
BY
ATTORNEY Patented Mar. 7, 1944

2,343,507

UNITED STATES PATENT OFFICE 2,343,507

ANTIFRICTION SCREW DEVICE

Henry S. Hoffar, West Vancouver, British Columbia, Canada, assignor, by mesne assignments, to The Cleveland Pneumatic Tool Company, Cleveland, Ohio, a corporation of Ohio Application February 10, 1943, Serial No. 475,397

7 Claims. (Cl. 74—459)

The present invention relates to antifriction screw devices and more particularly to improvements in such devices as illustrated in my Patent 2,298,011, granted October 6, 1942.

The above mentioned patent discloses an antifriction screw device comprising a screw member formed with a spiral groove and a nut having within its bore a complemental spiral groove. A plurality of alternate large and small balls are interengaged between the screw and nut and seat in the grooves thereof. The nut is formed with a by-pass passage extending generally lengthwise thereof and with opposite ends extending substantially radially and opening into axially spaced portions of its groove to effect recirculation of said balls as relative rotation is imparted to the nut and screw.

The primary object of the present invention is to provide improved means incorporated in the rotating nut for facilitating the circulation of the balls from end to end of the spiral groove in the nut.

Another object of the invention resides in the provision of a tube adapted to be carried by the rotating nut and having flexible characteristics, the construction of which makes it adaptable to close radius bends without appreciable distortion of its inner diameter at the bent or curved position.

A further object of the invention is to provide in an antifriction screw device a flexible tube carried by the rotating nut of said device, which does not rely upon an auxiliary clip or clamp to securely retain the tube in position, as in the prior art devices.

A still further object of the invention resides in the provision of an antifriction screw and nut device of the recirculating ball type that is capable of improved operation, and of a simplified construction which may be manufactured at a lower cost.

Other objects and advantages more or less ancillary to the foregoing reside in the specific construction and aggroupment of the elements peculiar to this structure, as will become apparent from a more complete examination of this specification.

In the drawing:

Fig. 1 is a vertical sectional view of an antifriction screw device embodying the features of the present invention and taken substantially on line 1—1 of Fig. 2.

Fig. 2 is a view in longitudinal cross section of the device taken substantially on line 2—2 of Fig. 1, the screw and balls being shown in elevation.

Fig. 3 is a view in elevation of the flexible tube as viewed on line 3—3 of Fig. 2.

Referring to the drawing for a more detailed description thereof, an antifriction screw device constructed in accordance with the present invention is generally designated by the reference numeral 5 and comprises a screw member 6 and nut 7. The maximum diameter of the screw member 6 is somewhat less than the minimum diameter of the bore 8 of the nut 7. The screw member 6 is formed with a spiral groove 9 in its surface while the nut 7 has its bore 8 formed with a complemental spiral groove 10 inclined in the same direction, and at the same pitch or degree of inclination as the spiral groove 9.

Because of the relative diameters of the screw and of the nut bore, when no balls are in the grooves it will be evident that the nut may be moved lengthwise along the screw without any relative rotation between them. If the complemental grooves of the nut and screw are placed in coinciding relation, however, balls may be inserted between the members to seat in both the nut and screw grooves, which will interconnect the nut and screw and transmit axial forces from one to the other.

In accordance with the present invention, and as disclosed in my above identified patent, a multiplicity of balls are interengaged between the screws 6 and nut 7 and travel in the complemental grooves of the two members. As in my patent, it is proposed to use alternate large and small balls 11 and 12 respectively, instead of the balls being all of the same size. As shown in Fig. 2 of the drawing, the nut 7 is in the shape of a spool presenting an annular recess 13 and a pair of end flanges 18. The annular recess 13 communicates with the spiral groove 9 of the member 6 through radial openings 14 and 15, the opening 14 being formed adjacent one end of the nut 7 while the opening 15 is formed adjacent the other end of said nut.

In prior art devices, it was customary to form a passage or conduit extending from end to end of the ball bearing nut, these being either machined in the nut or comprised of one or more rigid tubular conduits the ends of which were inserted into the nut in a manner to permit the circulation of the balls from end to end of the helical groove in the nut. In accordance with the present invention, and to overcome the disadvantages of the conventional rigid tube or by-pass passage, there is provided a flexible substantially U-shaped tube 16 formed of rubber, plastic or metal, the preferred type herein illustrated being of steel or other suitable metal in the form of a closely wound spring. The tube 16 is extremely flexible, easily constructed and adaptable to close radius bends without appreciable distortion of its inner diameter at the bent or curved position. As shown in Fig. 1 of the drawing, one end of the tube 16 is positioned within the opening 14 and wound around the nut 7 within the annular recess 13 in the form of a spiral so as to permit its other end to be positioned within the opening 15. By this construction the flexible tube 16 will at all times be in communication with the grooves of the screw and nut which will permit circulation of the balls therethrough upon relative rotation being imparted to the screw or the nut.

The construction of the flexible tube permits it to be readily inserted into the openings 14 and 15 in the nut, even though said openings may be diametrically smaller than the outside diameter of the flexible tube. It will be apparent that the spring-like tube may be reduced in diameter at either end by simply rotating the ends relative to the center portion of the spring tube prior to insertion within the openings 14 and 15. Thus, after insertion in the openings, the tube has a tendency to remain firmly in place due to the rebound of the material as it endeavors to assume its pre-fabricated dimensions. As a result of the tendency of the flexible tube to assume its normal shape after insertion into the nut openings, no clips or clamps will be necessary to retain the tube in position.

A further advantage in the use of a flexible tube of the type disclosed is thought to be readily apparent in that said tube is longitudinally flexible and thus will make possible the accommodation of more balls than would a rigid tube of similar normal length. This is a desirable feature as it will prevent overcrowding of the balls in the circuit.

It has also been found in actual practice that by employing a spring tube within the nut of an antifriction screw device that said tube may be inserted into one nut opening, for example opening 14, and then wound completely around the nut diameter within the annular recess 13 for one or more turns and, after loading with balls the free end inserted into the second opening 15. This will result in a supplemental number of balls in circuit which will effect a reduction in individual ball wear and thus increase the life of the balls.

In order to close the annular recess 13 and at the same time protect the tube 16 from damage, there is provided a shell or cover 17 which frictionally engages the flanged ends of the nut 7. The cover 17 is mounted for removal on the nut 7 should occasion demand inspection or replacement of the tube 16.

From the above description when taken in connection with the accompanying drawing, it is thought that the operation of the device is readily apparent. The device is especially adaptable for use in steering mechanisms of motor vehicles and in lifting jacks although its use is not limited thereto. Upon imparting rotation to the nut 7 the alternate large or small balls will travel within the complemental grooves 9 and 10 of the screw and nut 6 and 7 respectively, and as the balls reach the opening 14, with the nut travelling in one direction, said balls will circulate through the flexible tube 16 and be discharged therefrom through the opening 15 to again travel through the grooves 9 and 10. Thus the circulating balls will interconnect the nut and screw and transmit axial forces from one to the other. With the tube 16 formed of steel or other suitable metal in the form of a closely wound spring, there will be very little friction present thus assuring free movement of the balls as they travel through said tube.

Although the foregoing description is necessarily of a detailed character, in order to completely set forth the invention, it is to be understood that the specific terminology is not intended to be restrictive or confining and it is to be further understood that various rearrangements of parts and modifications of structural detail may be resorted to without departing from the scope or spirit of the invention as herein claimed.

I claim:

1. An antifriction screw device of the character described comprising, a screw member formed with a groove, a cooperating member encircling said screw member and having a groove complemental to said screw member groove and movable axially relative thereto, a plurality of balls interengaged between said members in the grooves thereof for transmitting force from one to the other, and flexible means defining with said screw member and cooperating member an orbit guiding said balls for recirculation between said members.

2. An antifriction screw device of the character described comprising, a screw member formed with a groove, a cooperating member encircling said screw member and movable axially relative thereto, said cooperating member having a groove complemental to said screw member groove, a plurality of balls interengaged between said members adapted to travel between said grooves for transmitting force from one to the other, and a flexible cooperating member communicating with the grooves of said members for guiding said balls for recirculation between said members upon relative movement being imparted thereto.

3. An antifriction screw device of the character described comprising, a screw member formed with a groove, a cooperating member encircling said screw member and movable axially relative thereto, said cooperating member having a groove complemental to said screw member groove, a plurality of balls interengaged between said members adapted to travel between said grooves for transmitting force from one to the other, and flexible means carried by said cooperating member communicating with the grooves of said member for guiding said balls for recirculation between said members upon relative movement being imparted thereto.

4. An antifriction screw device of the character described comprising, a screw member formed with a groove, a nut encircling said screw member having a groove complemental to said screw member groove and movable axially relative thereto, a plurality of balls interengaged between said screw member and nut in the grooves thereof for transmitting force from one to the other, said nut being formed with an annular recess extending substantially throughout the length thereof, an opening at each end of said recess communicating with said grooves, and flexible means supported within said openings for guiding said balls for recirculation between said screw member and nut upon relative movement being imparted thereto.

5. An antifriction screw device of the character described comprising, a screw member formed with a groove, a nut encircling said screw member having a groove complemental to said screw member groove and movable axially relative thereto, a plurality of balls interengaged between said screw member and nut in the grooves thereof for transmitting force from one to the other, said nut being formed with an annular recess extending substantially throughout the length thereof, an opening at each end of said recess communicating with said grooves, and a tube disposed within said annular recess and having each end thereof supported within said openings for guiding said balls for recirculation between said screw member and nut upon relative movement being imparted thereto.

6. An antifriction screw device of the character described comprising, a screw member formed with a groove, a nut encircling said screw member having a groove complemental to said screw member groove and movable axially relative thereto, a plurality of balls interengaged between said screw member and nut in the grooves thereof for transmitting force from one to the other, said nut being formed with an annular recess extending substantially throughout the length thereof, an opening at each end of said recess communicating with said grooves, and a flexible tube disposed in said annular recess and encircling the diameter of said nut, the ends of said flexible tube being supported within said openings for guiding said balls for recirculation between said screw member and nut upon relative movement being imparted thereto.

7. An antifriction screw device of the character described comprising, a screw member formed with a groove, a nut encircling said screw member having a groove complemental to said screw member groove and movable axially relative thereto, a plurality of balls interengaged between said screw member and nut in the grooves thereof for transmitting force from one to the other, and a flexible tube in the form of a coil spring carried by said nut communicating with the grooves of said screw and nut for guiding said balls for recirculation between said screw and nut upon relative movement being imparted thereto.

HENRY S. HOFFAR.